(12) United States Patent
Wilbrink et al.

(10) Patent No.: US 8,041,594 B2
(45) Date of Patent: *Oct. 18, 2011

(54) SYSTEM FOR IMPORTING CALENDAR DATA FROM A COMPUTER SCREEN INTO A CALENDAR APPLICATION

(75) Inventors: Tijs Y Wilbrink, Voorburg (NL); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 12/348,685

(22) Filed: Jan. 5, 2009

(65) Prior Publication Data

US 2009/0113415 A1    Apr. 30, 2009

Related U.S. Application Data

(63) Continuation of application No. 10/605,725, filed on Oct. 22, 2003, now Pat. No. 7,475,021.

(51) Int. Cl.
*G06Q 10/00* (2006.01)
(52) U.S. Cl. ................................... 705/7.18
(58) Field of Classification Search ............ 705/7.18
See application file for complete search history.

(56) References Cited

U.S. PATENT DOCUMENTS

| | | | |
|---|---|---|---|
| 5,664,063 A | 9/1997 | Johnson et al. | |
| 5,859,969 A | 1/1999 | Oki et al. | |
| 6,006,035 A * | 12/1999 | Nabahi | 717/175 |
| 6,016,478 A | 1/2000 | Zhang et al. | |
| 6,085,205 A * | 7/2000 | Peairs et al. | 715/209 |
| 6,094,681 A | 7/2000 | Shaffer et al. | |
| 6,216,110 B1 * | 4/2001 | Silverberg | 705/7.19 |
| 6,272,532 B1 | 8/2001 | Feinleib | |
| 6,282,709 B1 | 8/2001 | Reha et al. | |
| 6,339,795 B1 | 1/2002 | Narurkar et al. | |
| 6,353,928 B1 | 3/2002 | Altberg et al. | |
| 6,505,167 B1 | 1/2003 | Horvitz et al. | |
| 6,604,079 B1 | 8/2003 | Ruvolo et al. | |
| 6,965,900 B2 | 11/2005 | Srinivasa et al. | |
| 7,113,797 B2 | 9/2006 | Kelley et al. | |
| 7,158,980 B2 | 1/2007 | Shen | |

(Continued)

FOREIGN PATENT DOCUMENTS

WO    WO 9534857    * 12/1995

OTHER PUBLICATIONS

Maddix, Nicholas, A Comparison of Text Importing Tools for Users of PALM Compatiable PDAs Anagram, 2001.*

(Continued)

*Primary Examiner* — Scott L Jarrett
(74) *Attorney, Agent, or Firm* — Cantor Colburn LLP

(57) ABSTRACT

An exemplary embodiment of the invention relates to a method, system, and storage medium for performing calendaring and reminder activities for a computer user. The method includes analyzing text displayed on a computer screen, identifying calendar parameters resulting from the analysis, creating a calendar entry record that includes a source of the calendar parameters, pasting the calendar parameters into the calendar entry record, and automatically storing the calendar entry record in a calendar application without opening the calendar application. Calendar parameters include at least one of a date, a time, a meeting type, and a subject.

15 Claims, 14 Drawing Sheets

U.S. PATENT DOCUMENTS

| | | | |
|---|---|---|---|
| 7,302,643 B1* | 11/2007 | Edlund et al. | 715/703 |
| 7,475,021 B2* | 1/2009 | Wilbrink et al. | 705/7.19 |
| 2003/0217126 A1 | 11/2003 | Polcha et al. | |
| 2004/0249919 A1 | 12/2004 | Mattheis | |
| 2005/0209914 A1 | 9/2005 | Nguyen et al. | |

OTHER PUBLICATIONS

Hilbert, David M. et al., Agens for Collectin Application Usage Data Over the Internet Proceedings of the second international conference on Autonomous Agents, May 1998.*

Liu, Hugo et al. Meeting Runner: An Automatic Email-Based Meeting Scheduler BCL Computers, Inc. 2002.*

RNPalm.com—Cognitive Root—Simplicity Review Feb. 2001, Retreived from Archive.org Feb. 27, 2008.* eGrabber.com Web pages eGrabber, Inc., May 2000, Retreived from Archive.org Feb. 27, 2008.*

Neuendorf, Dave et al., InstallAnywhere, InstallShield Multiplatform and InstallShield Developer Journal of Object Technology Forum, vol. 1, No. 2, Jul./Aug. 2002.*

Padwick, Gordon et al., Special Edition Using Microsoft Outlook 2000 Que, May 12, 1999, ISBN 0-7897-1909-6.*

Jackson, Keaka et al., SEXY (Standford Event eXtraction sYstem) Standford, Autumn 2003.*

NCR Announces Availability of Software Management and Client Management Enterprise Networks, Business Wire, Jun. 22, 1992.

IBM Licenses Full Line of Industry-Standard Software Development Solutions From InstallShield(R) Software Corporation, PR Newswire, Jun. 28, 2000.

InstallShield Integrates with IBM Tivoli for Seamless Software Packaging and Deployment, PR Newswire, Apr. 9, 2003.

Calendar Agents on the Semantic Web, [online]; [retrieved on Jan. 6, 2009]; retrieved form the Internet http://www.scs.cmu.edu/~spftagents/papers/84-86.pdf.

Dynamic Load Balancing on Web-server Systems, [online]; [retrieved on Jan. 6, 2009]; retrieved from the Internet http://cireseerx.ist.psu.edu/viewdoc/summary?doi=10.1.1.8.1895.

May 2000 eGrabber.com Web Pages, [online]; [retrieved on Jan. 6, 2009]; retrieved from the Internet http://web.archive.org.

Introduction to How Virtual Private Networks Work, [online]; [retrieved on Jan. 6, 2009]; retrieved from the Internet http://computer.howstuffworks.com/vpn.htm.

Load balancing (computing), [online]; [retrieved on Jan. 6, 2009]; retrieved from the Internet http://en.wikipedia.org/wiki/Load_balancing_(computing).

Put Time-Saving Anagram on Your Must-Get List, [online]; [retrieved on Jan. 6, 2009]; retrieved form the Internet http://www.highbeam.com/doc/1P2-7729527.html.

Syncplicity Review, [online]; [retrieved on Jan. 6, 2009]; retrieved from the Internet http://www.mpalm.com/syncplicity.htm.

* cited by examiner

SYSTEM FOR IMPORTING CALENDAR DATA FROM A COMPUTER SCREEN INTO A CALENDAR APPLICATION

CROSS-REFERENCE TO RELATED APPLICATIONS

This application is a continuation of U.S. patent application Ser. No. 10/605,725, filed Oct. 22, 2003, the disclosure of which is incorporated by reference herein in its entirety.

BACKGROUND

The present invention relates generally to data processing activities and, more particularly, to a method, system, and storage medium for performing calendaring and reminder activities for computer clients.

As computer technology becomes more advanced, computer users are able to install and utilize large numbers of complex software applications as well as perform a wide variety of online activities such as research, web surfing, instant messaging, and shopping, to name a few. Software applications in the business community are quickly replacing traditional paper-based tasks, such as writing memos, scheduling meetings, sending reminders, and creating reports. One popular personal and business application is an electronic calendar application that not only allows individuals to track appointments and special events, but also offers the convenience of sharing the calendar data with other users online or through a communications network environment. Most calendaring programs are offered as a value-added tool to existing applications such as an email program (e.g., Microsoft Outlook™). While these programs are useful in their ability to organize and track an individual's business and personal events, they suffer from some disadvantages as well. For example, if an individual is viewing a web site and discovers an event or item that he/she would like to enter into a calendar, the individual must first open the calendar program and then enter the relevant data. Sometimes the user will highlight a Uniform Resource Locator (URL) associated with the online event and paste it into the calendar program. However, if the URL should later change, the calendar information becomes useless to the individual. Thus, calendar references saved by an individual can become outdated thereby diminishing the usefulness of the calendar application. Further, switching between the user's web browser (or other application) and the calendar program is time-consuming and inconvenient.

Accordingly, it would be desirable to be able to record information into a calendar program without the need to switch between applications. It would also be desirable to provide a way to ensure that the calendared information is up-to-date and accurate.

SUMMARY

The foregoing discussed drawbacks and deficiencies of the prior art are overcome or alleviated by a method, system, and storage medium for performing calendaring and reminder activities for a computer user. The method includes analyzing text displayed on a computer screen, identifying calendar parameters resulting from the analysis, creating a calendar entry record that includes a source of the calendar parameters, pasting the calendar parameters into the calendar entry record, and automatically storing the calendar entry record in a calendar application without opening the calendar application. Calendar parameters include at least one of a date, a time, a meeting type, and a subject.

BRIEF DESCRIPTION OF THE SEVERAL VIEWS OF THE DRAWINGS

Referring to the exemplary drawings wherein like elements are numbered alike in the several Figures.

DETAILED DESCRIPTION

Disclosed herein is a method, system, and storage medium for performing calendaring and reminder activities for computer clients. The calendaring and reminder system enables a computer user to identify, select, and enter an event into the user's calendar program without opening the calendar program. The calendaring and reminder system further provides analysis of the stored calendar information to ensure that it is up-to-date and accurate.

Figure 1:
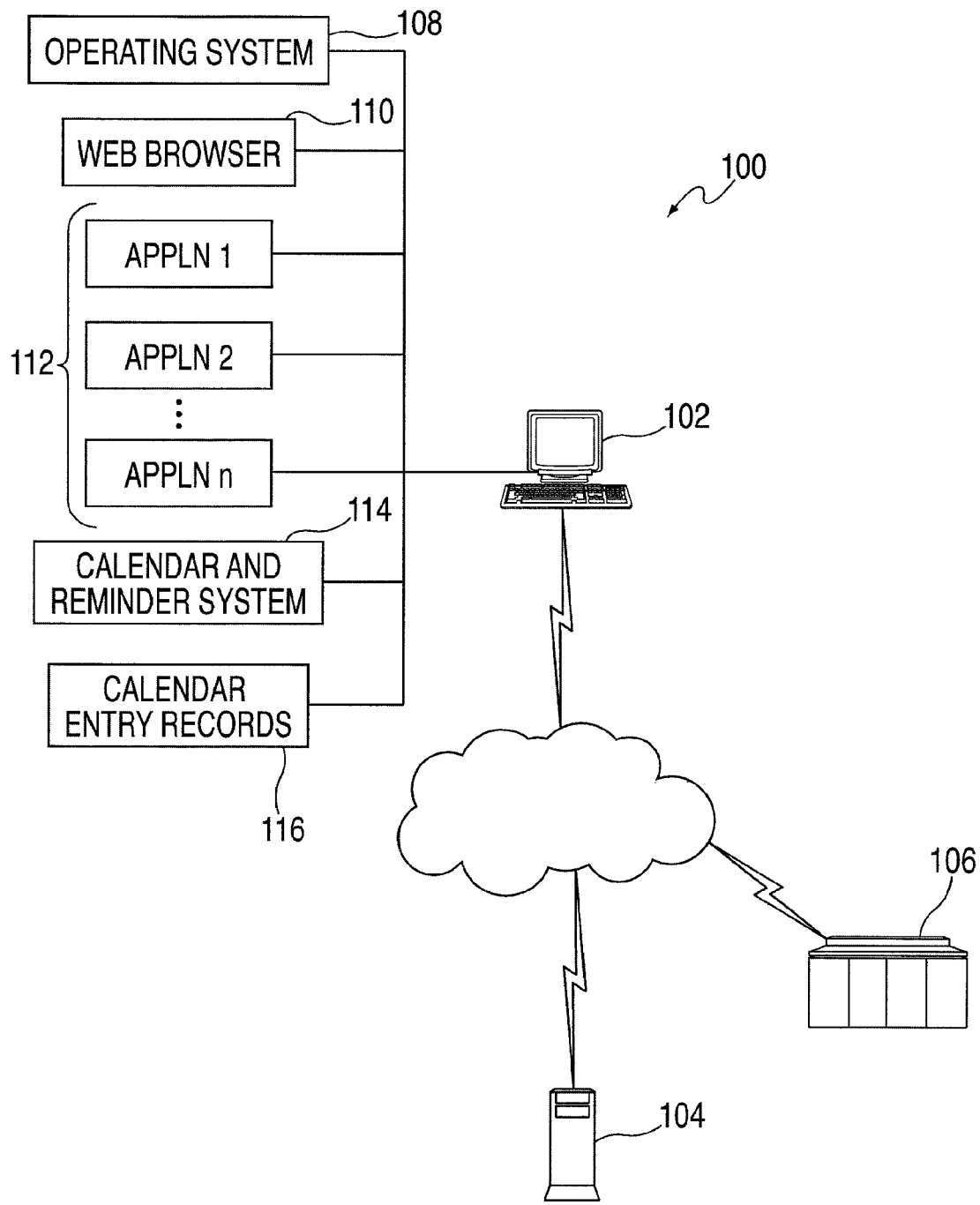
FIG. 1 is a block diagram of a system upon which the calendaring and reminder system is implemented in accordance with an exemplary embodiment of the invention.

Referring initially to FIG. 1, there is shown a block diagram of a network system for implementing the calendaring and reminder system. Network system 100 includes a computer client system 102 in communication with a server 104 and a host system 106 via a network connection. The network connection may comprise any suitable communications networking technology known in the art such as an Intranet, an Extranet, a Virtual Private Network, a wide area network, the Internet, etc.

Computer client system 102 may be a general-purpose desktop computer that subscribes to an Internet service provider and includes operating system software 108, a web browser component 110, various applications 112, and the calendaring and reminder system 114. The calendaring and reminder system creates calendar entry records 116 as described further herein. It will be understood by those skilled in the art that the calendaring and reminder system 114 of the invention may be executed on computer systems with variant architectures. Operating system 108 software such as Microsoft DOS™ or Unix™ may be employed by computer client system 102. Client system 102 further executes a web browser application 110 such as Microsoft's Internet Explorer™ or Netscape Navigator™. Typical applications 112 that may reside on computer client system 102 and execute therefrom include word processing applications, spreadsheet applications, email and messaging applications, graphics tools, and other similar programs. The calendaring and reminder system 114 is loaded into the computer client system operating system 108 upon initialization and may be accessed by various means including selecting an icon on the user's computer screen window or by selecting a unique key or key combination on the user's keyboard.

The calendaring and reminder system 114 may be implemented as a plug-in application to an existing program such as the email application listed above, or may operate as a standalone calendar program that incorporates the features and functions of the invention as described herein.

Server 104 refers to a source of information used by a user of computer client system 102 in selecting and storing events on the computer client system. Server 104 provides content to computer clients such as client system 102 over the Internet. For example, server 104 may be operated by a business enterprise that maintains a web site for its customers. While only one server 104 is shown, it will be understood that any number of servers may be used in order to realize the advantages of the invention.

In the embodiment described with respect to FIG. 1, computer client system 102 executes the calendaring and reminder system 114 and stores the calendaring and reminder system internally. In an alternative embodiment, host system 106 executes the calendaring and reminder system 114 on behalf of computer client system 102, allowing client system 102 access to its features and functions as described further herein.

Host system 106 comprises a high-powered multiprocessor computer device including web server and applications server software for receiving requests from computer client system 102 to access applications and/or data via the Internet or other network. For example, host system 106 may be operated by an electronic utilities (e-utilities) business that outsources computing resources such as applications including the calendaring and reminder system application 114.

As indicated above, the calendaring and reminder system 114 may be executed as a standalone application that is installed or downloaded on computer client system 102 or may be incorporated into an existing messaging application or similar commercially-available product as an enhancement feature. Further, as indicated above, the features of the calendaring and reminder system 114 may be provided via a third party application service provider (ASP) or e-utilities broker where service is provided for a per-use fee. These and other embodiments are described further in FIGS. 6-9.

Figure 2:
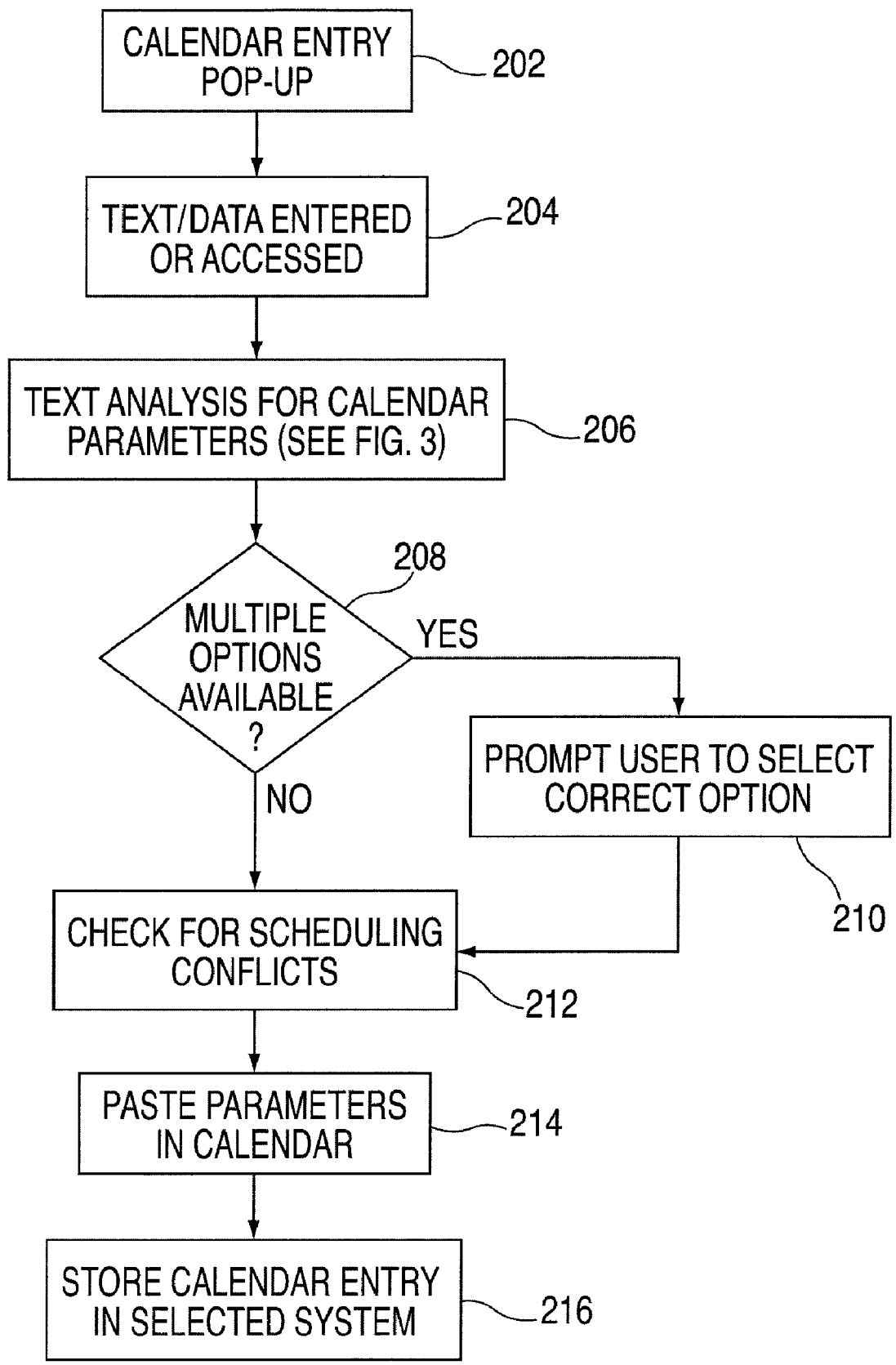
FIG. 2 is a flowchart describing a process of implementing the calendaring and reminder system in accordance with a further aspect of the invention.
Figure 5:
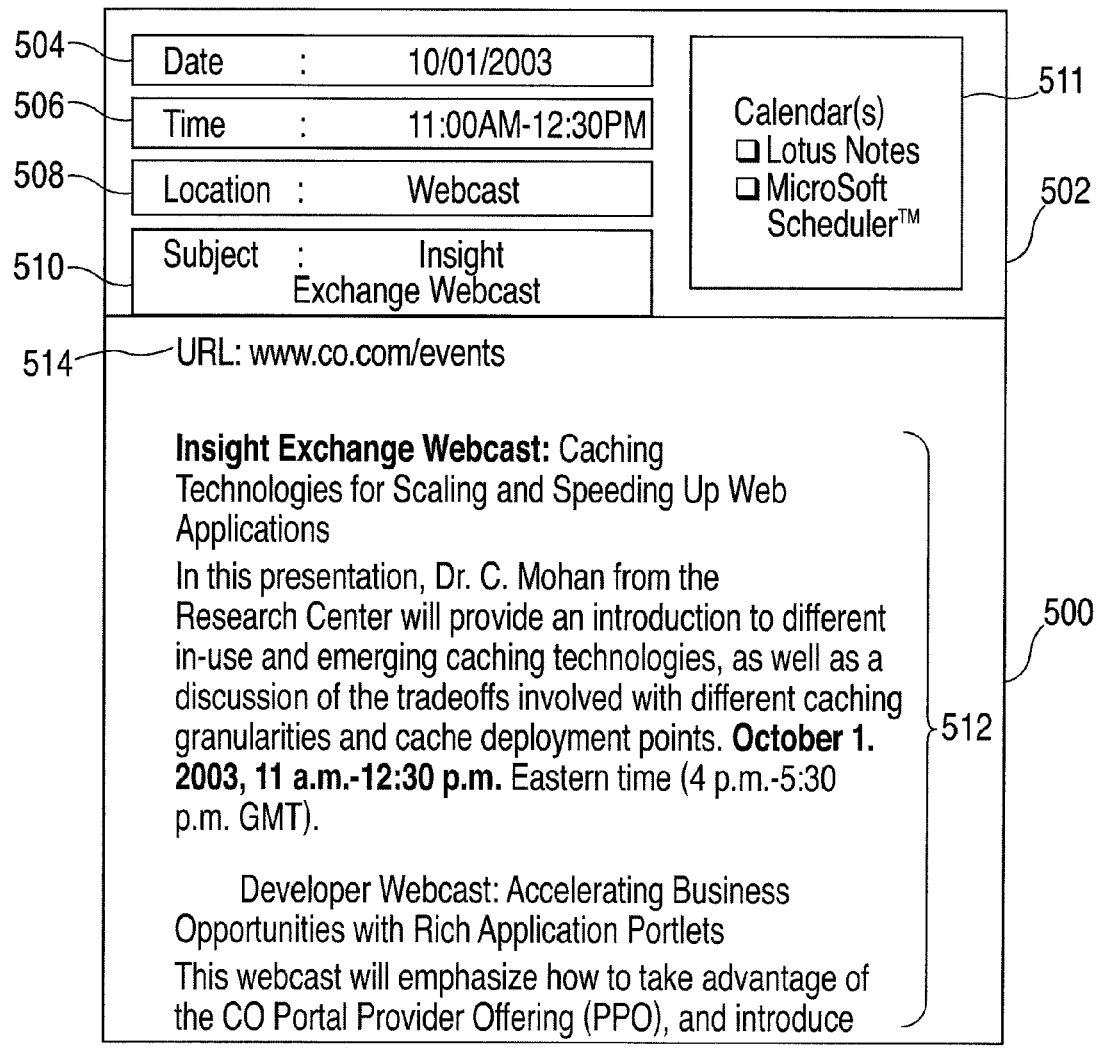
FIG. 5 is a sample computer screen window depicting an active application and a subwindow provided by the calendaring and reminder system in accordance with a further aspect of the invention.

FIG. 2 is a flowchart describing the process of implementing the calendaring and reminder system 114 in an exemplary embodiment. The calendaring and reminder system 114 is loaded into memory when operating system 108 is started. The process steps described in FIG. 2 assume that a computer user is executing an application and that an active document has been presented on the user's computer screen. The application may be any suitable application including a word processing application, a web browser program in which the user is accessing a web site or a web page, an email application in which the user is opening an email message, etc. At step 202, a user on computer client system 102 activates the calendaring and reminder system 114 which causes a subwindow to pop up on the user's computer screen and is illustrated in FIG. 5. The subwindow 502 of computer screen 500 includes fields for date 504, time 506, location 508, and subject 510 for the event to be logged, and may include a list of calendar applications 511 (e.g., one of calendar applications comprising applications 112) on the user's computer that can be selected to store or include the calendar entry. The calendar entry further includes a space to store the information source 514 such as a web site address or document that is used to define the calendar event settings.

The user may select a portion of the active document 512 on computer screen 500 that includes the data to be included in the calendar entry record, or may directly select the time and date to be used in the calendar entry at step 204. By selecting these portions, the system will be more efficient and effective in locating the information the user would like to include. It will be understood that the process recited in step 204 may precede that of step 202 and that the steps described herein are not limited to the order in which they are presented. The active document 512 is analyzed for specific information (e.g., calendar parameters) to include in the calendar entry, such as time, date, place, and a subject suitable for calendar entry at step 206. Step 206 is described in further detail in FIG. 3.

If the results of step 206 include several options at step 208, for example, multiple dates or times, the user is presented with the findings to select the desired option at step 210. If there is only one set of time, date, etc., to include in the calendar entry, that information is used for pasting into the calendar and the calendaring and reminder system 114 checks for conflicts at step 212. This may be accomplished by comparing the calendar parameters found in the active document 512 to data stored in the calendar application. For example, if two events are requested for the same date and time, the calendaring and reminder system 114 alerts the user of this conflict. The user may bypass the conflict and schedule both events or select between the events if desired.

The information selected by the user is pasted into the calendar entry record by the calendaring and reminder system 114 at step 214. If desired, the user may change the settings for the information to be included in the calendar entry record or simply save the calendar entry in the selected calendar application at step 216. The calendaring and reminder system 114 automatically stores the calendar record 116 as well as the calendar entry in the selected calendars that the user indicated in step 202 without opening up the calendar application or switching between applications. The calendar entry record includes information on the location of the document or source that was used to create the calendar entry record.

In an alternate embodiment, the calendar entry record may include the information on the location of the document or source that was used to create the calendar entry.

Figure 3:
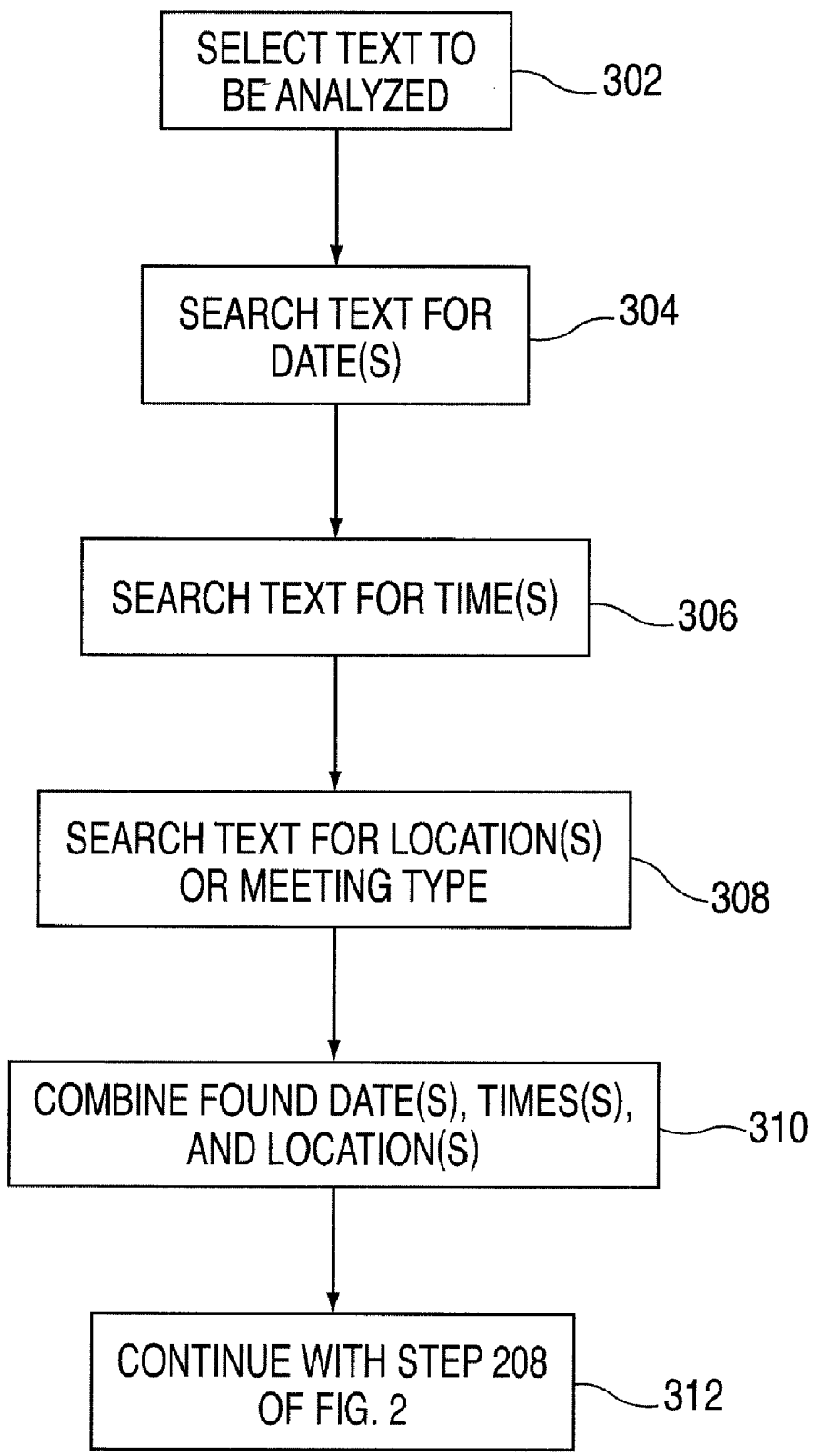
FIG. 3 is a flowchart describing a process of analyzing text via the calendaring and reminder system in accordance with a further aspect of the invention.

FIG. 3 is a flowchart describing the process of analyzing text for calendar parameters as recited in step 206 of FIG. 2. The text to be analyzed is selected at step 302. This step uses the text selected by the user in step 204 of FIG. 2. If this is not available, the complete text of the active document may be used, starting with the text that is visible on the computer screen. At step 304 the selected text portion is searched for the existence of one or more dates. The text is also searched for one or more times (e.g., a meeting time) at step 306. This step may use the time definitions provided by the operating system 108 to translate potential differences in time zones in accordance with the user's system settings. These definitions of times in the operating system 108 may also be used to select times in the active document, as its descriptions (e.g., "eastern time" or "EDT") may match with a specific time in the selected text.

The selected text is searched for a meeting type or location at step 308. This step utilizes a defined set of meeting types provided by the calendaring and reminder system 114. This defined set of meeting types may be expanded by the user by entering a type of meeting into the calendar entry that is otherwise unknown to the system. A location may be defined as a conference call number, a physical address, an online address for a chat room or web-enabled presentation, etc.

All found dates, times, locations (or meeting types) are combined, based on the text portion in which these are found at step 310. It is likely that dates, times, and locations that are listed near one another inside a text portion are related. At step 312, the process resumes with the method described in FIG. 2 at step 208, or alternatively, step 412 of FIG. 4.

Figure 4:
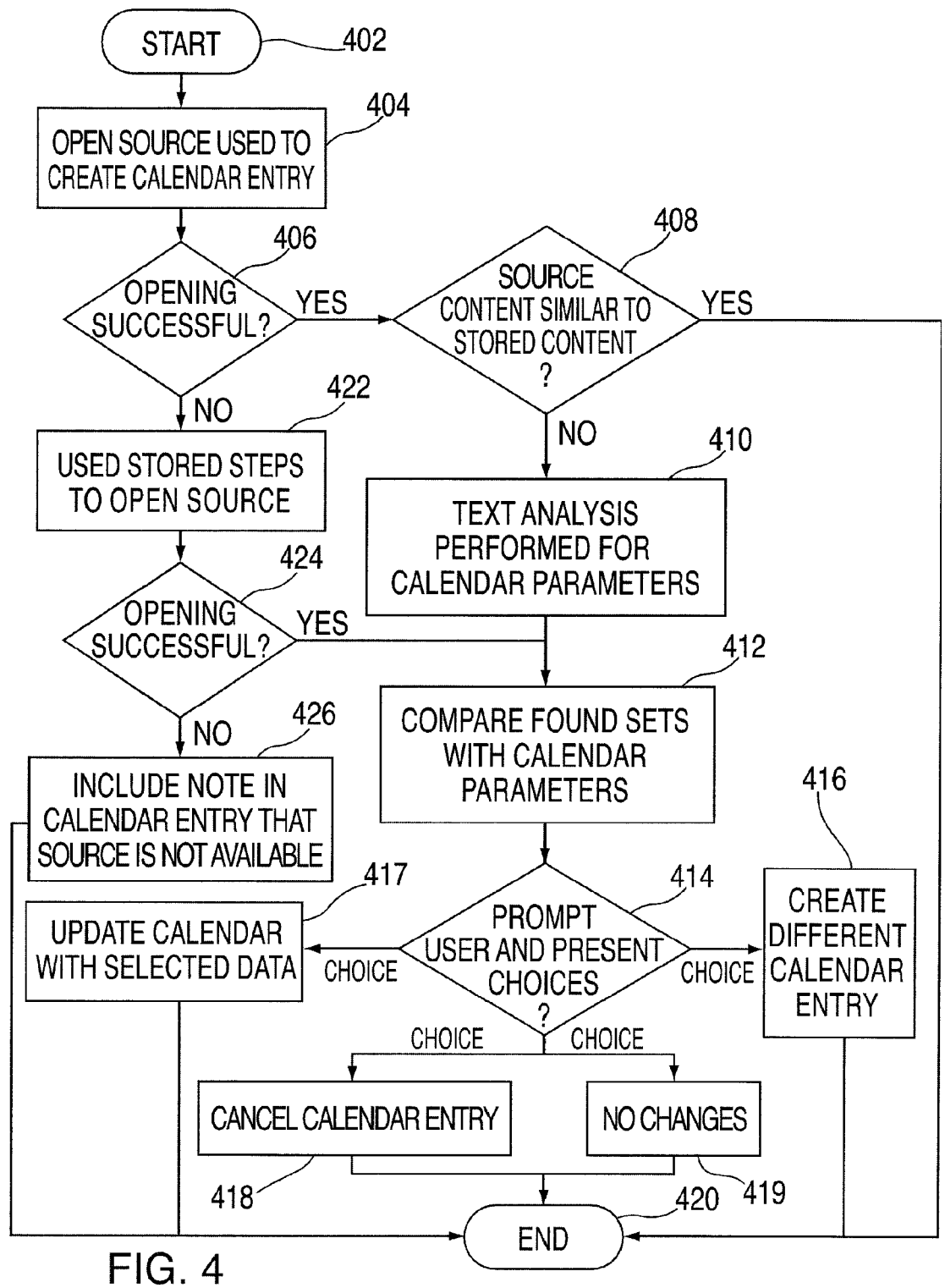
FIG. 4 is a flowchart describing a process of validating and updating a calendar record via the calendaring and reminder system in accordance with an exemplary embodiment of the invention.

FIG. 4 is a flowchart describing the process of validating and updating a calendar record via the calendaring and reminder system 110 in an exemplary embodiment. When the current date falls within a predefined period in relation to the date of a calendar entry, the calendaring and reminder system 114 checks the calendar entry for currency and updates the entry if necessary as described herein. At step 402 a reminder is associated with the calendar entry that prescribes when the validation will be executed. When the reminder is effected, the calendaring and reminder system 114 selects the calendar entry that is due to be updated at step 404 and the location of the document or data source that was used to create the calendar entry is opened. The document or data source may include a web site address, a uniform resource locator, a file name and path in a directory, and an email folder. If successfully opened at step 406, the contents of the document or data are compared with the contents that have been stored in the calendar entry and any similarities are determined at step 408. If the source content is similar, no updates are necessary and the process ends at step 420. If the source content is not similar to the contents of the calendar entry, a text analysis is performed for the calendar parameters as described in FIG. 3 at step 410. The information relating to times, dates, and locations is then used to compare with the calendar parameters stored in the calendar entry at step 412. The user is prompted to select an option at step 414. Options provide the user with new dates, time, and/or subjects. The user may choose to update the calendar with the selected data at step 417, create a different calendar entry at step 416, cancel the calendar entry at step 418, or leave the calendar entry unchanged at step 419. Regardless of the option selected, the process then ends at step 420.

Returning now to step 406, if the document or data source cannot be opened at step 406, the calendaring and reminder system 114 may use the stored steps or locations that were saved in another selected calendar system as described in step 216 of FIG. 2. If the source is successfully opened at step 424, the process proceeds to step 412 as described above. Otherwise, a note is attached to the user's calendar entry that the source of the calendar entry is no longer available at step 426 and the process ends at step 420.

The calendaring and reminder system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of Calendaring and Reminder System Software. To implement the calendaring and reminder systems and methods of the present invention, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 6A and 6B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely, parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of the same should be readily understood.

Figure 6A:
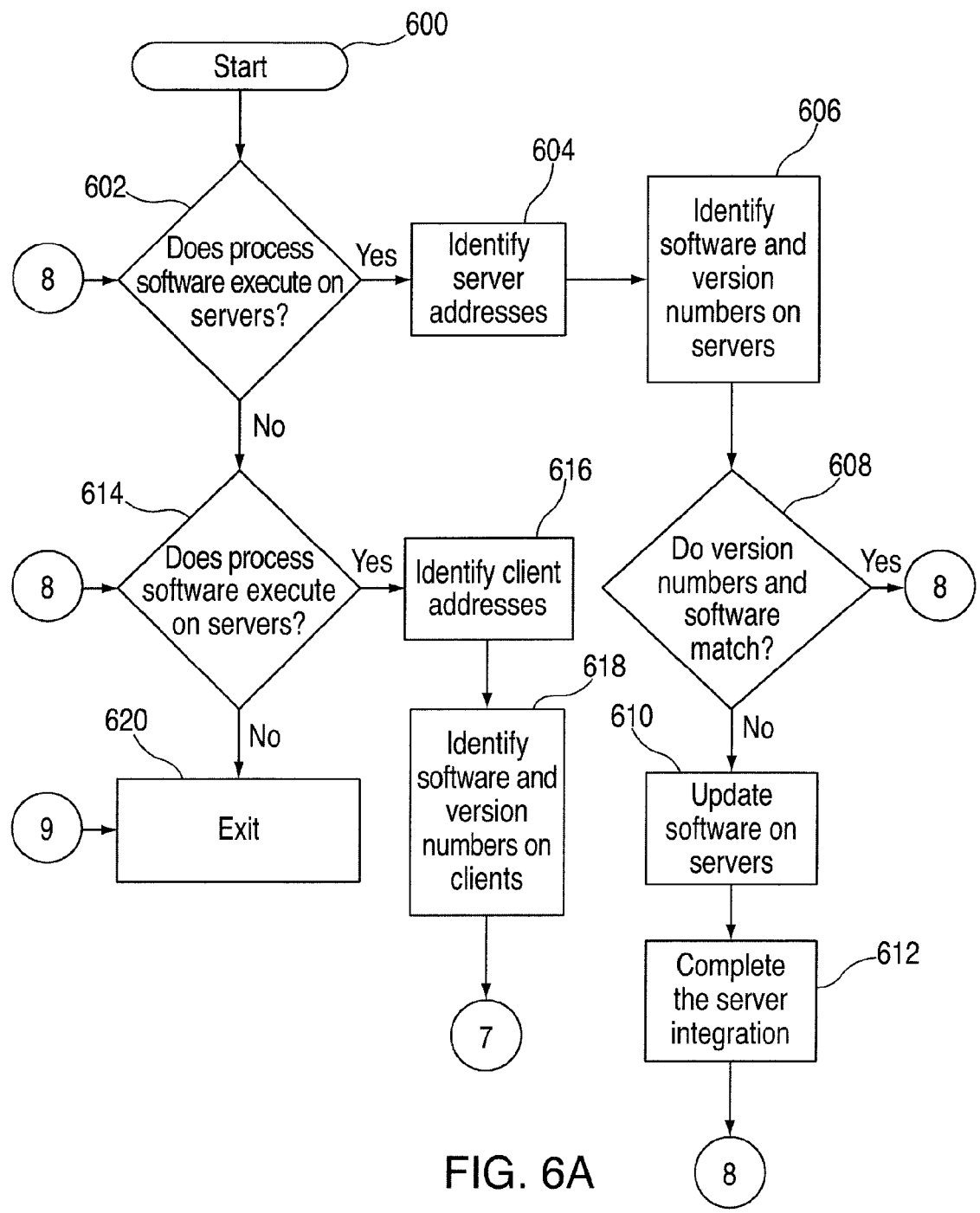
FIGS. 6A and 6B are flowcharts illustrating how the process software implementing the systems and methods of the invention may be integrated into client, server, and network environments.
Figure 6B:
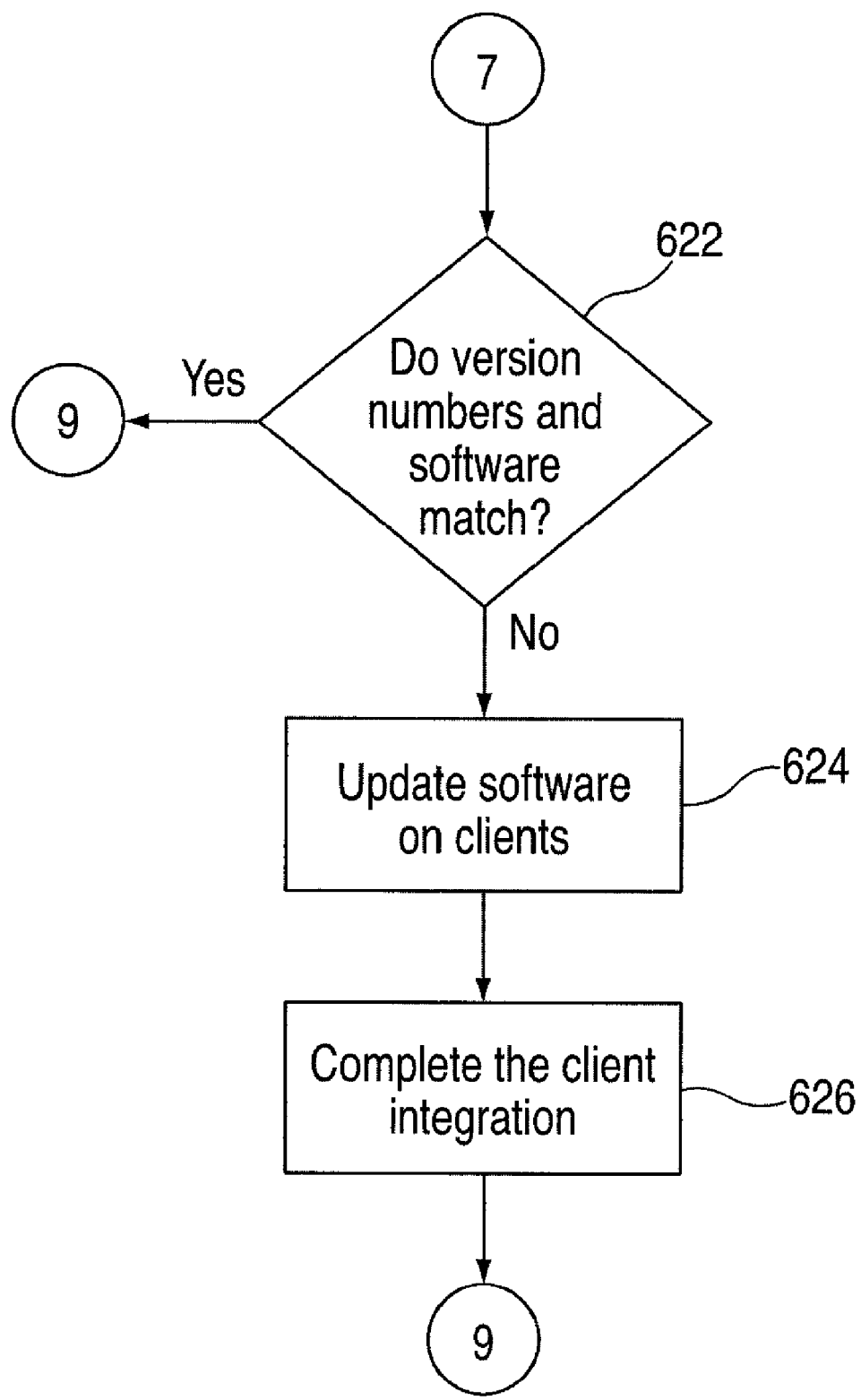

Referring to FIGS. 6A and 6B, step 600 begins the integration of the process software for implementing the calendaring and reminder systems and methods of the present invention. It is determined whether there are any process software programs that will execute on a server or servers at step 602. If this is not the case, then integration proceeds to determine if the process software will execute on clients at step 614. If this is the case, then the server addresses are identified at step 604. The servers are checked to see if they contain software that includes the operating system (OS), applications, and network operating systems (NOS), together with their version numbers, that have been tested with the process software at step 606. The servers are also checked to determine if there is any missing software that is required by the process software as part of the activity at step 606. A determination is made if the version numbers match the version numbers of OS, applications and NOS that have been tested with the process software at step 608. If all of the versions match and there is no missing required software the integration continues at step 614. If one or more of the version numbers do not match, then the unmatched versions are updated on the server or servers with the correct versions at step 610. Additionally, if there is missing required software, it is updated on the server or servers at step 610. The server integration is completed by installing the process software at step 612.

Step 614, which follows either of steps 602, 608 or 612, determines if there are any programs of the process software that will execute on the clients. If no process software programs execute on the clients, the integration proceeds to step 620 and exits. If this not the case, then the client addresses are identified at step 616.

At step 618, the clients are checked to see if they contain software that includes the operating system (OS), applications, and network operating systems (NOS) software, together with their version numbers, that have been tested with the process software. The clients are also checked at step 618 to determine if there is any missing software that is required by the process software.

At step 622, a determination is made if the version numbers match the version numbers of OS, applications and NOS that have been tested with the process software. If all of the versions match and there is no missing required software, then the integration proceeds to step 620 and exits.

If one or more of the version numbers do not match, then the unmatched versions are updated on the clients with the correct versions at step 624. In addition, if there is any missing required software, it is updated on the clients as part of step 624. The client integration is completed by installing the process software on the clients at step 626. The integration proceeds to step 620 and exits.

Deployment of calendaring and reminder system software. It should be well understood that the process software for implementing the calendaring and reminder system of the present invention may be deployed by manually loading the process software directly into the client, server and proxy computers from a suitable storage medium such as a CD, DVD, etc.. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the computer clients that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a computer client. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of same with reference to FIGS. 7A and 7B, where the deployment processes are illustrated, will be more easily understood.

Step 700 begins the deployment of the process software. It is determined whether there are any programs that will reside on a server or servers when the process software is executed at step 702. If the answer is "yes", then the servers that will contain the executables are identified, as indicated in step 736 in FIG. 7B. The process software for the server or servers is transferred directly to the servers' storage via FTP or some other protocol or by copying though the use of a shared file system at step 738. The process software is then installed on the servers as indicated at step 740.

Figure 7A:
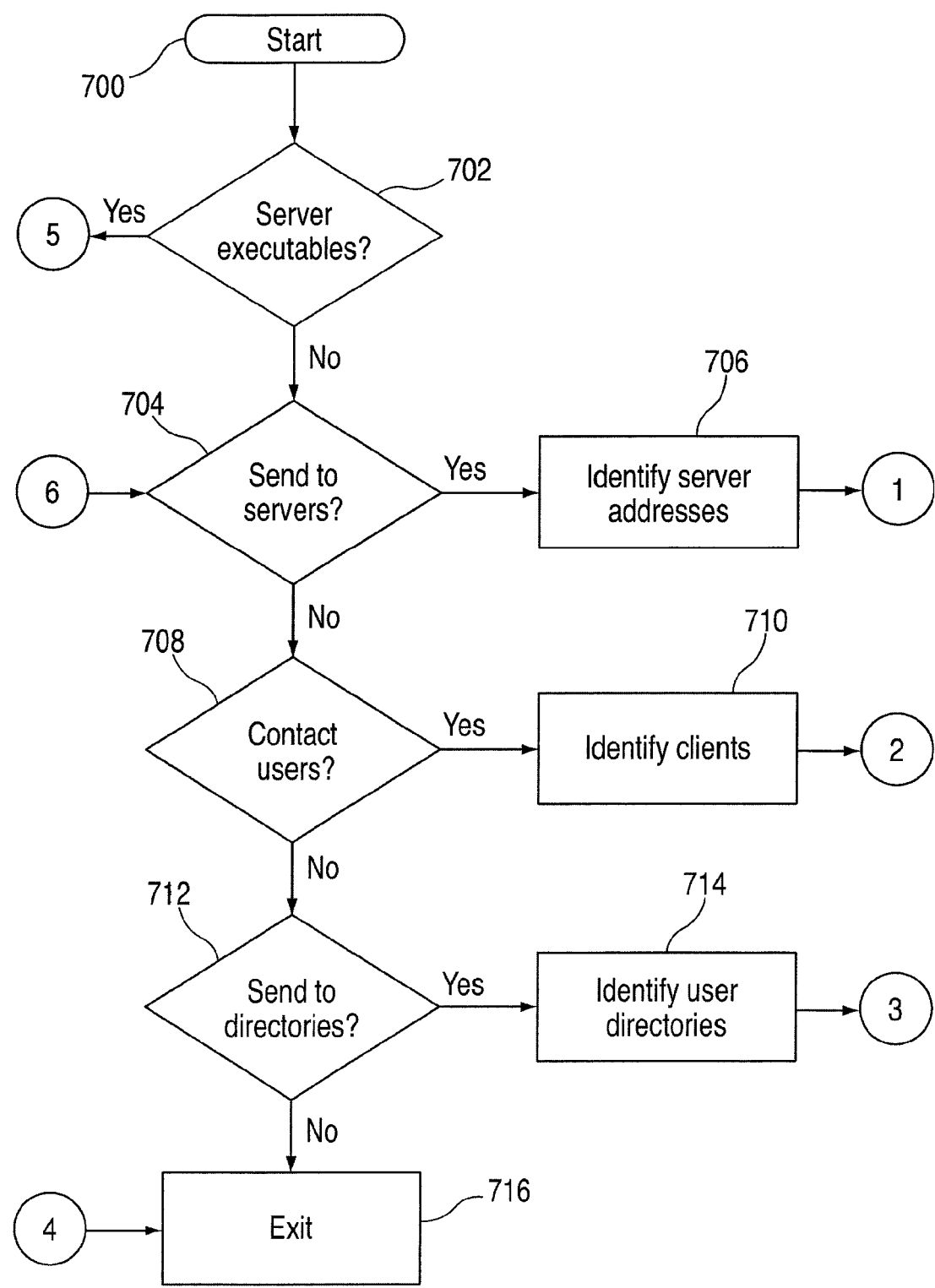
FIGS. 7A and 7B are flowcharts illustrating various ways in which the process software of the invention may be semi-automatically or automatically deployed across various networks and onto server, client (user), and proxy computers.
Figure 7B:
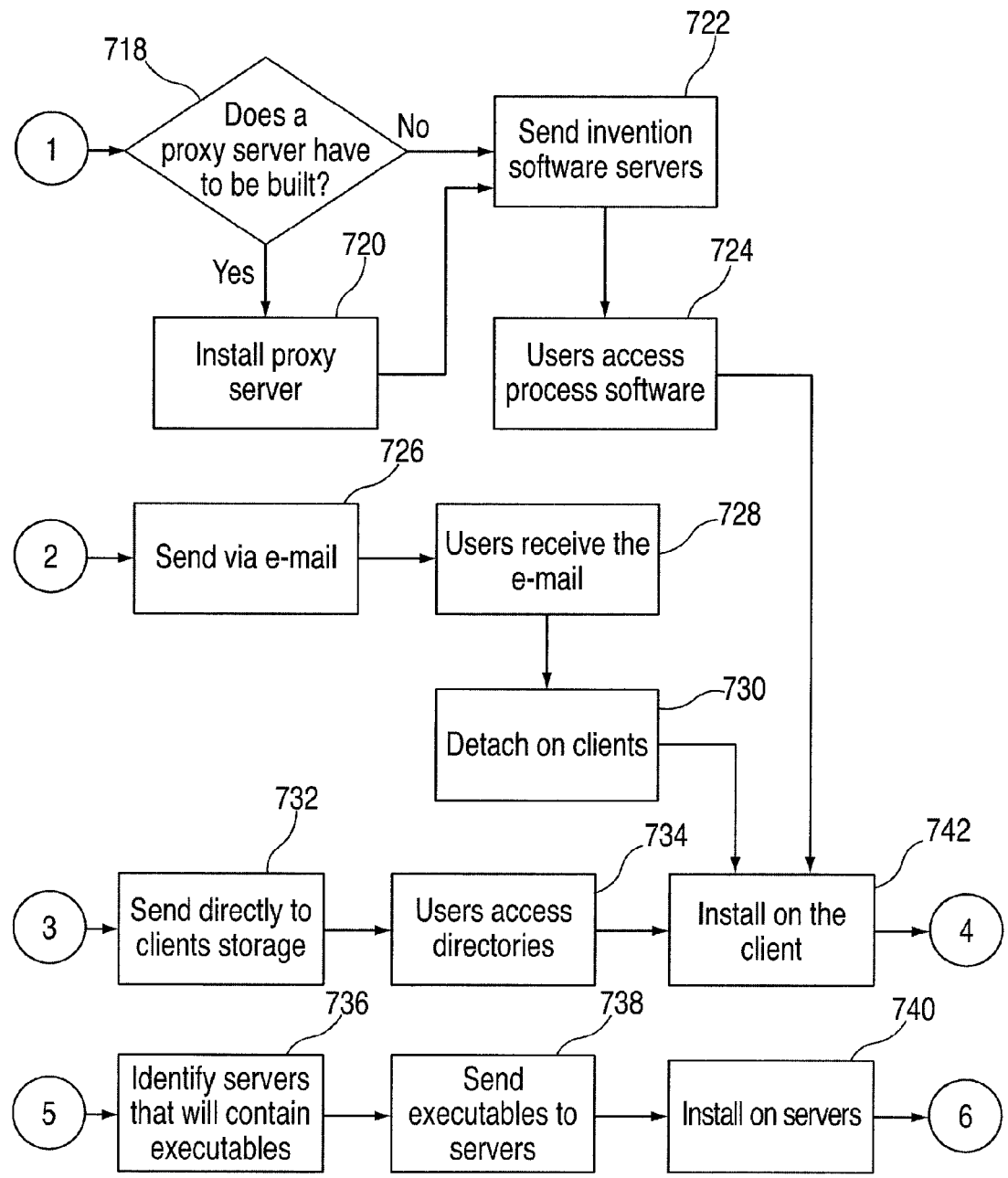

Next, as shown in step 704 in FIG. 7A, a determination is made on whether the process software is to be deployed by having users access the process software on a server or servers. If the users are to access the process software on servers, then the server addresses that will store the process software are identified at step 706.

Next, as shown at step 718, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, it is installed as indicated at step 720. Next, the process software for implementing the present invention is sent to the servers, as indicated in step 722 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their computer clients, then access the process software on the servers and copy it into to the file systems of their computer clients at step 724. Another alternative is to have the servers automatically copy the process software to each client and then run the installation program for the process software at each computer client. Either way, the user computer executes or causes to be executed the program that installs the process software on the computer client at step 742, then the process exits at step 716.

Continuing now at step 708 in FIG. 7A, a determination is made as to whether the process software is to be deployed by sending the process software to users via e-mail. If the answer is yes, then, as indicated at step 710, the set of users where the process software will be deployed are identified together with the addresses of the user computer clients. The process software is sent via e-mail in step 726 (shown in FIG. 7B) to each of the users' computer clients. As indicated in step 728, the users receive the e-mail, and detach the process software from the e-mail to a directory on their computer clients at step 730. The user then executes the program that installs the process software on his computer client at step 742 and exits the process at step 716.

Continuing at step 712 (see bottom of FIG. 7A), a determination is made of whether the process software will be sent directly to user directories on their computer clients. If so, the user directories are identified at step 714. Then, the process software is transferred directly to the identified directory on user's computer client, as indicated in step 732. This can be done in several ways such as, but not limited to, sharing the file system directories and copying from the sender's file system to the recipient user's file system or, alternatively, using a transfer protocol such as File Transfer Protocol (FTP). Next, the users access the directories on their client file systems, as indicated in step 734, in preparation for installing the process software. Finally, the user executes the program that installs the process software on his computer client at step 742 and then exits the process at step 716.

Use of virtual private networks for calendaring and reminder system software. The process software may be deployed, accessed, and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (e.g., a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 8A-8C should be more readily understood.

Figure 8A:
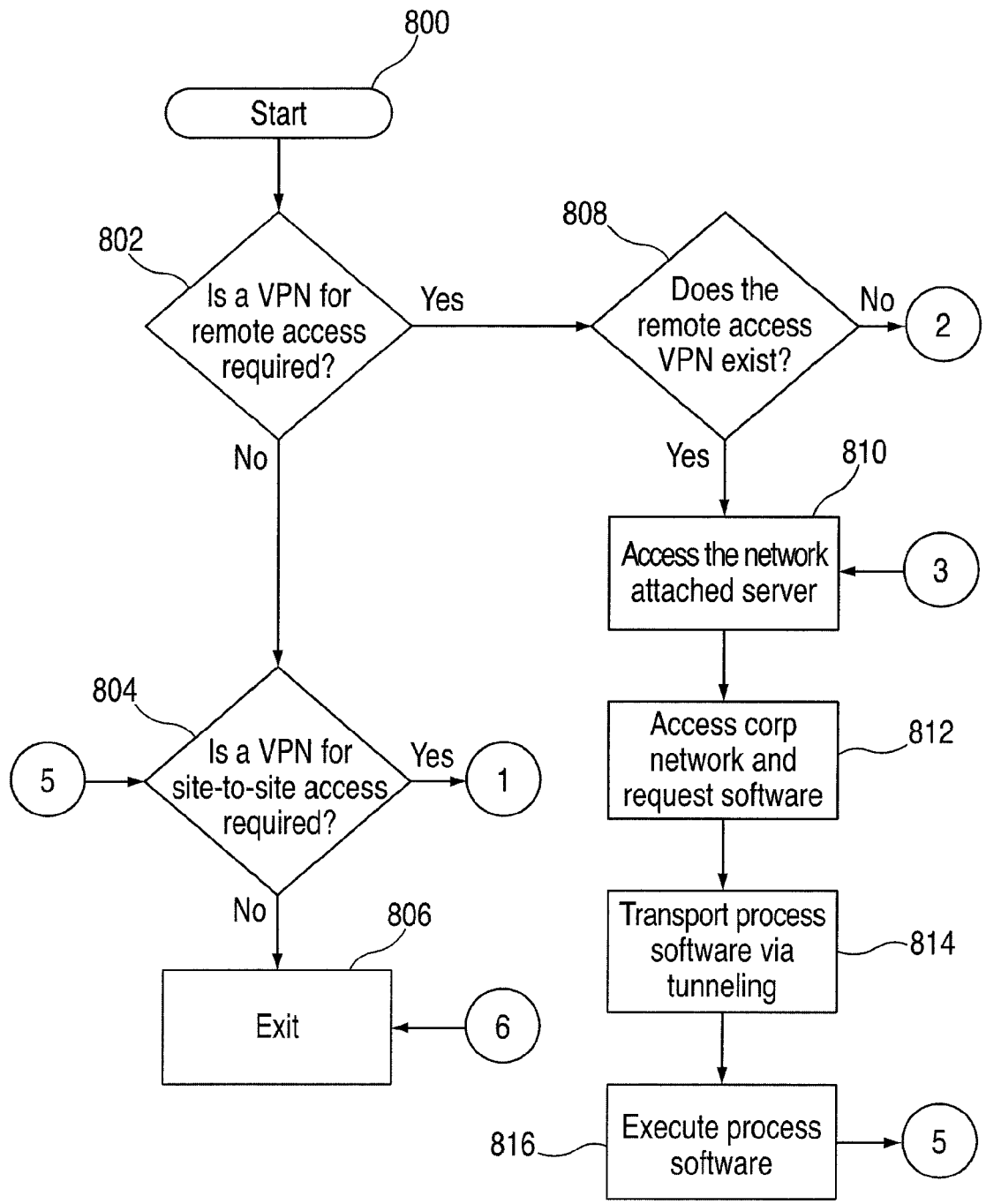
FIGS. 8A through 8C are flowcharts illustrating how process software for implementing the systems and methods of the invention are deployed through the installation and use of two different forms of a virtual private network (VPN)
Figure 8B:
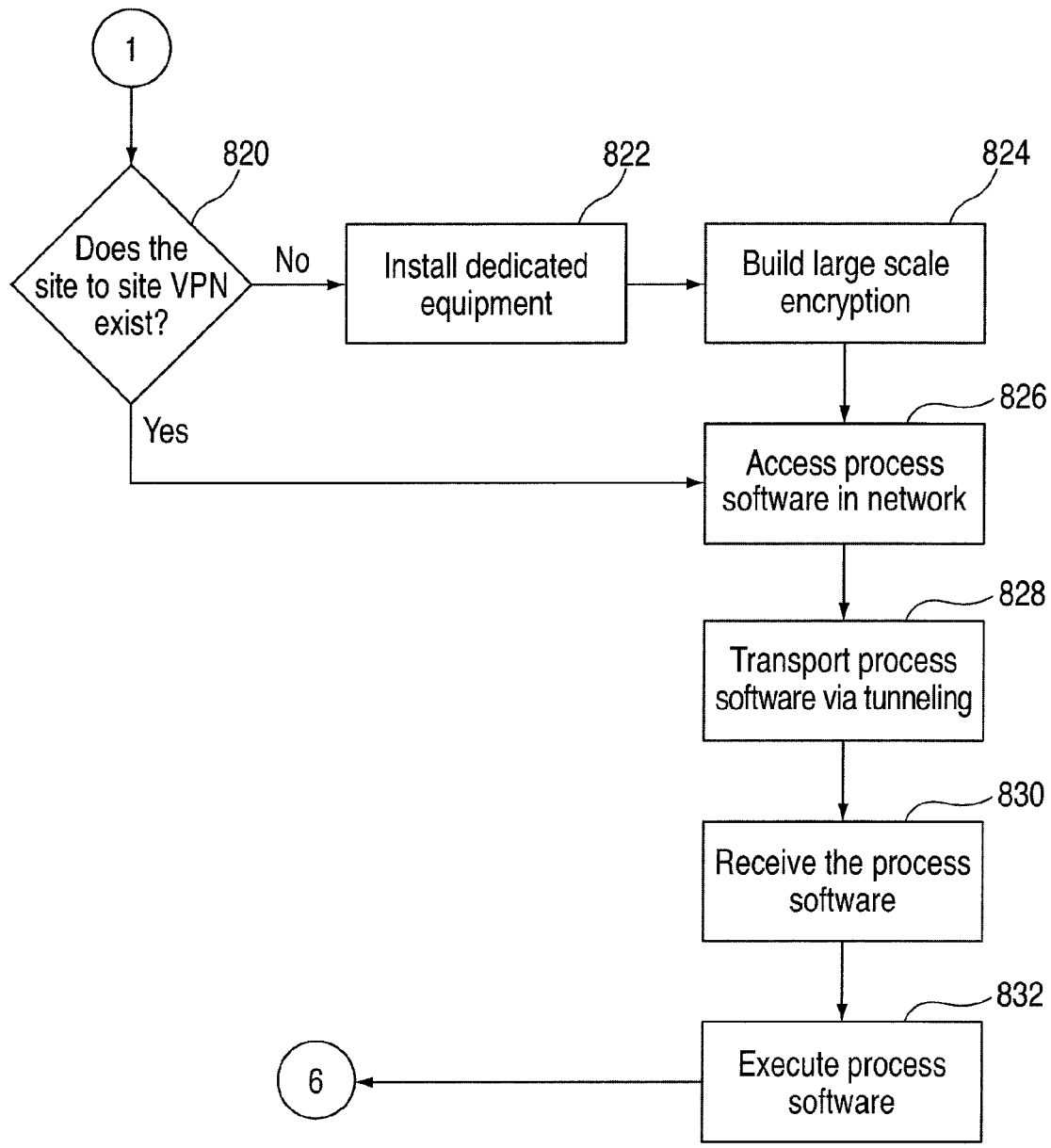
Figure 8C:
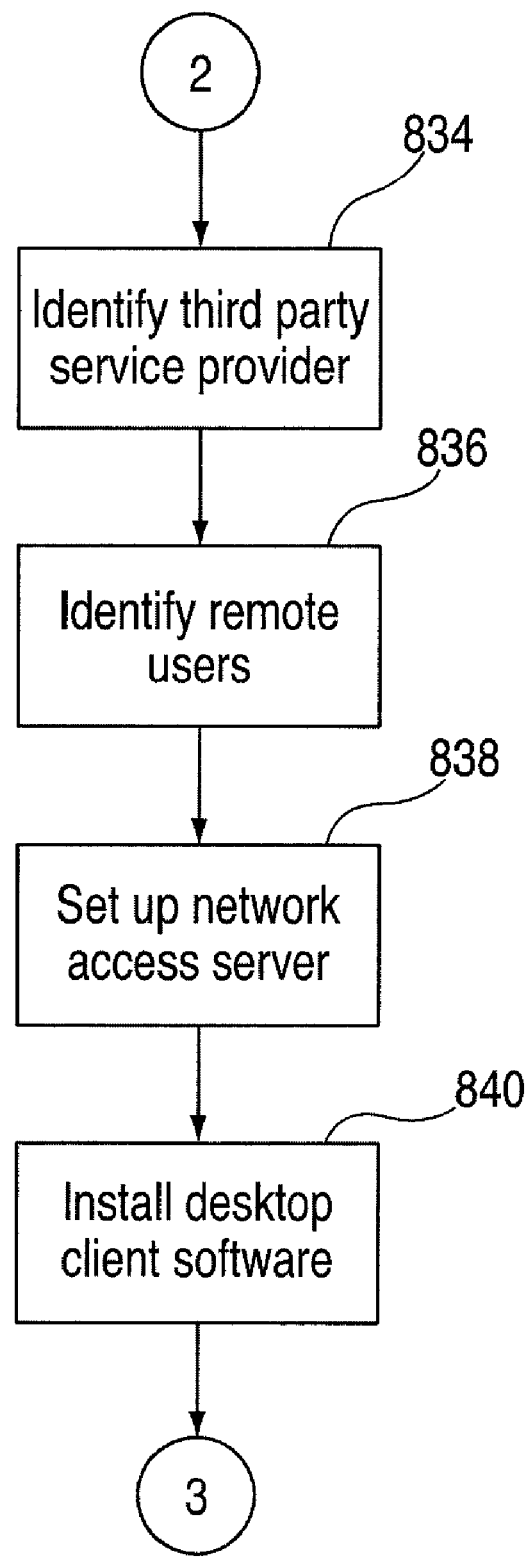
Figure 9A:
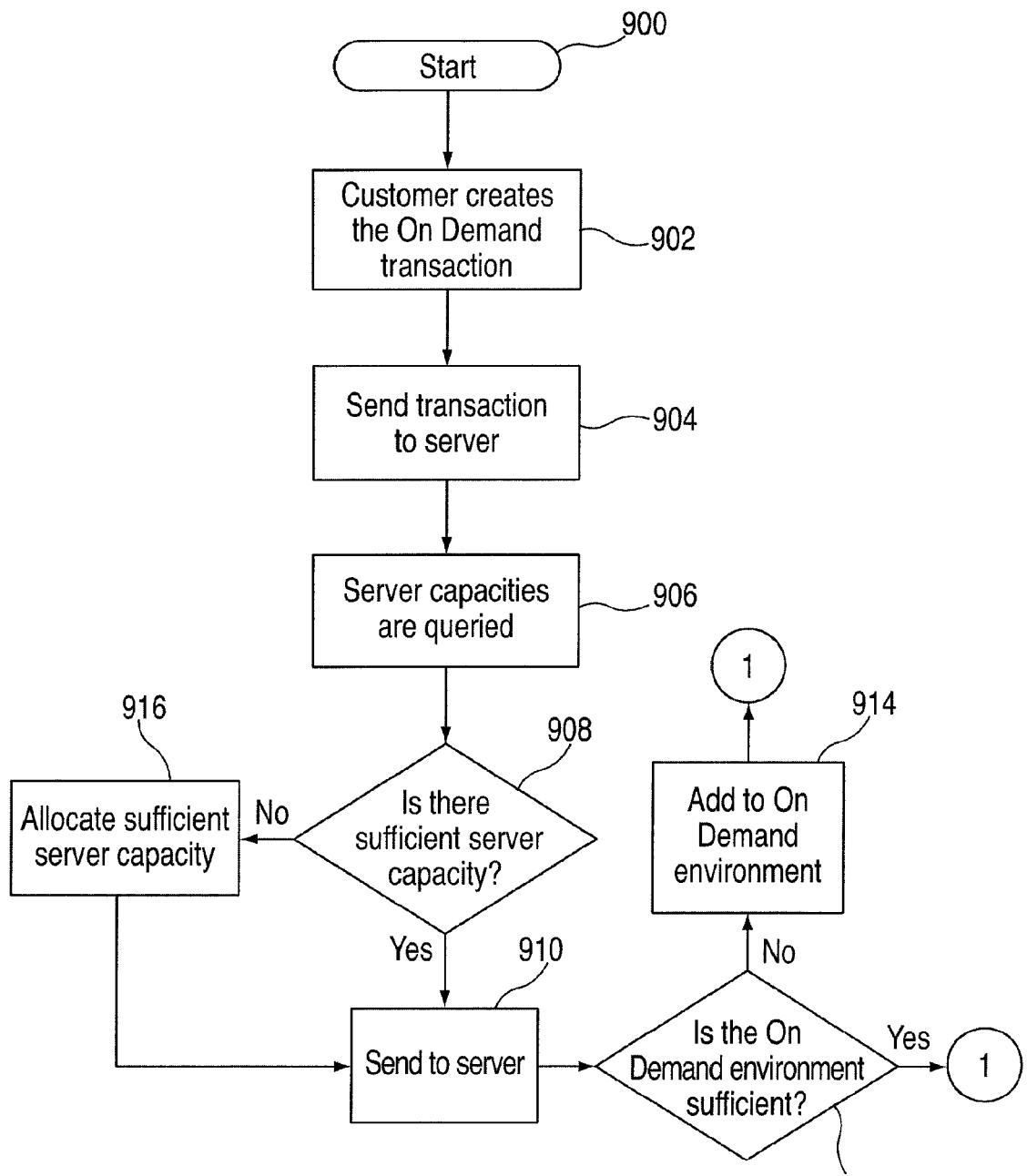
FIGS. 9A and 9B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 9B:
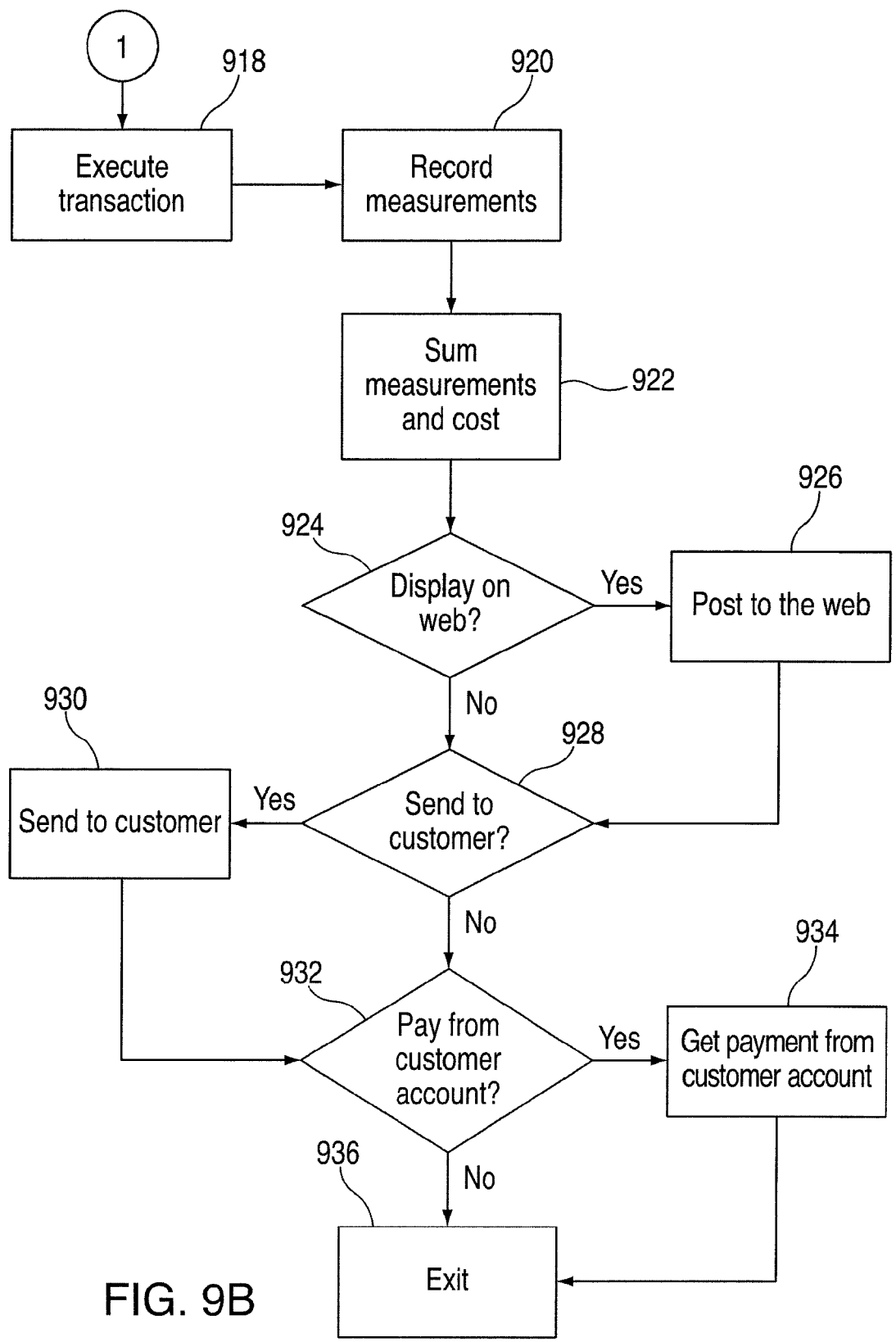

Step 800 in FIG. 8A begins the virtual private network (VPN) process. A determination is made at step 802 to see if a VPN for remote access is required. If it is not required, then flow proceeds to step 804. If it is required, then flow proceeds to step 808 where a determination is made if as to whether a remote access VPN exists that is available for use.

If a remote access VPN does exist, then flow proceeds to step 810 in FIG. 8A. Otherwise flow proceeds to step 834 (see top of FIG. 8C), where a third party provider that will provide the secure, encrypted connections between the company's private network and the company's remote users is identified. Next, as indicated in step 836, the company's remote users are identified. At step 838, the identified third party provider sets up a network access server (NAS). The NAS allows the remote users to dial a phone number (typically a toll free number) or attach directly via a cable, DSL, wireless, or other modem to access, download, and install the desktop client software for the remote-access VPN as indicated at step 840.

Returning to step 810 in FIG. 8A, after the remote access VPN has been built or if it been previously installed, the remote users can then access the process software by dialing into the NAS or attaching directly via a cable, DSL, or other modem into the NAS. This step 810 allows entry into the corporate network, as indicated at step 812, where the process software may be accessed. The process software is transported to the remote user's desktop computer over the network via tunneling. During tunneling (step 814), the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 816.

Returning now to step 804 in FIG. 8A, a determination is made to see if a VPN for site-to-site access is required. If it is not required, then flow proceeds to the exit at step 806. If it is required, flow proceeds to step 820 (see top of FIG. 8B) to determine if the site-to-site VPN exists. If it does exist, then flow proceeds to step 826. If it does not exist, then as indicated at step 822, dedicated equipment required to establish a site-to-site VPN is installed. Then a large-scale encryption is built into the VPN at step 824.

After the site-to-site VPN has been built, or if it had been previously established, the users access the process software via the VPN as indicated in step 826. Next, the process software is transported to the site users over the network via tunneling as indicated in step 828. As previously explained, the process software is divided into packets and each packet including the data and protocol is placed within another packet, as indicated in step 830. When the process software arrives at the remote user's desktop, it is removed from the packets, reconstituted, and executed on the site users desktop at step 832. The process proceeds to step 806 and exits.

On Demand computing for calendaring and reminder system software. The process software for implementing the calendaring and reminder system of the present invention may be shared; that is, it may be used to simultaneously serve multiple customers in a flexible, automated fashion. Process software is easily standardized, requires little customization, and is scalable, thus providing capacity on demand in a pay-as-you-go model known as "on demand" computing. An overview of on demand computing as applied to the message analysis software will now be provided, followed by a more detailed description of same made with reference to the flowcharts of FIGS. 9A and 9B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 9A and 9B, where the on demand processes are illustrated, will be more easily understood.

Step 900 begins the On Demand process. A transaction is created that contains the unique customer identification, the requested service type and any service parameters that further specify the type of service as indicated in step 902. The transaction is then sent to the main server as shown in step 904. In an On Demand environment the main server can initially be the only server, then as capacity is consumed other servers are added to the On Demand environment.

The server central processing unit (CPU) capacities in the On Demand environment are queried at step 906. The CPU requirement of the transaction is estimated, then the servers available CPU capacity in the On Demand environment are compared to the transaction CPU requirement to see if there is sufficient CPU available capacity in any server to process the transaction as indicated in step 908. If there is not sufficient server CPU available capacity, then additional server CPU capacity is allocated to process the transaction as indicated in step 916. If there was already sufficient available CPU capacity, the transaction is sent to a selected server at step 910.

Before executing the transaction, a check is made of the remaining On Demand environment to determine if the environment has sufficient available capacity for processing the transaction as indicated at step 912. This environment capacity consists of such things as but not limited to network bandwidth, processor memory, storage, etc. If there is not sufficient available capacity, then capacity will be added to the On Demand environment as indicated in step 914. Next the required software to process the transaction is accessed, loaded into memory, then the transaction is executed as indicated in step 918.

The usage measurements are recorded as indicated in step 920. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer as indicated in step 922.

If the customer has requested that the On Demand costs be posted to a web site as indicated in step 924, then they are posted to a web site at step 926. If the customer has requested that the On Demand costs be sent via e-mail to a customer address as indicated in step 928, then they are sent to the customer via e-mail as indicated in step 930. If the customer has requested that the On Demand costs be paid directly from a customer account at step 932, then payment is received directly from the customer account at step 934. The On Demand process proceeds to step 936 and then exits.

As will be appreciated from the above description, the restrictions and limitations that exist with messaging systems are efficiently overcome. The calendaring and reminder system of the invention enables users of email and instant messaging systems to work interoperably, allowing them to switch between messaging systems, in order to improve overall communicational efficiency.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A system for performing calendaring and reminder activities for a computer user, comprising:
- a computer client system executing at least one calendar application and at least one of: a web browser program; an email program; a word processing program;
- a link to a server, wherein said computer client system accesses data from said server via a communications network;
- a calendaring and reminder system accessible to said computer client system; and
- a calendar entry record stored on said computer client system; wherein said calendaring and reminder system performs:
  - analyzing text displayed on a computer screen of said computer client system;
  - identifying calendar parameters resulting from said analyzing, said calendar parameters comprising at least one of: a date; a time; a location; a meeting type; and a subject;
  - creating a calendar entry record, said calendar entry record including a source of said calendar parameters;
- pasting said calendar parameters into said calendar entry record;
  - automatically storing said calendar entry record in said calendar application without opening said calendar application;
  - deploying process software for performing said calendaring and reminder activities, said deploying comprising:
    - installing said process software on at least one server;
    - identifying server addresses for users accessing said process software on said at least one server;
    - installing a proxy server when needed;
    - sending said process software to said at least one server and copying said process software to a file system of said at least one server;
    - sending the process software to at least a first computer client;
    - executing said process software on said first computer client;
  - integrating process software for performing said calendaring and reminder activities, said integrating comprising:
    - determining when said process software will execute on at least one server;
    - identifying an address of said at least one server;
    - checking said at least one server for operating systems, applications, and version numbers for validation with said process software, and identifying any missing software applications for said at least one server that are required for integration;
    - updating said at least one server with respect to any operating system and application that is not validated for said process software, and providing any of said missing software applications for said at least one server required for said integration;
    - identifying client addresses and checking computer clients for operating systems, applications, and version numbers for validation with said process software, and identifying any software applications missing from said computer clients that are required for integration;
    - updating said computer clients with respect to any operating system and application that is not validated for said process software, and providing any missing software application for said computer clients required for said integration;
    - installing said process software on said computer clients and said at least one server;
  - on demand sharing of process software for performing said calendaring and reminder activities, said on demand sharing comprising:
    - creating a transaction containing unique customer identification, requested service type, and service parameters;
    - sending said transaction to at least one main server;
    - querying said at least one main server about processing capacity associated with said at least one main server to help ensure availability of adequate resources for processing of said transaction;
    - allocating additional processing capacity when additional capacity appears needed to process said transaction, said additional processing capacity being selected from the group of additional capacities consisting of central processing unit capacity, processor memory capacity, network bandwidth capacity, and storage capacity;
  - recording a plurality of usage measurements selected from the group of usage measurements consisting of network bandwidth, processor memory, storage, and central processing unit cycles;
  - summing said usage measurements;
  - acquiring at least one multiplicative value associated with said usage measurements and with unit costs;
  - recording any such acquired multiplicative value as an on demand charge to a requesting customer;
  - charging said on demand charge to said requesting customer's account when an account exists and when said requesting customer has selected a charge account payment method;
  - deploying, accessing, and executing process software for performing said calendaring and reminder activities, said deploying, accessing, and executing process software implemented through a virtual private network, the method comprising:
    - determining when a virtual private network is required;
    - checking for remote access to said virtual private network when it is required;
    - when said remote access does not exist, identifying a third party provider to provide secure, encrypted connections between a private network and remote users;
    - identifying said remote users; and
    - setting up a network access server operable for downloading and installing client software on desktop computers for remote access of said virtual private network;
    - accessing said process software;
    - transporting said process software to at least one remote user's desktop computer;
    - executing said process software on said at least one remote user's desktop computer;
    - determining when said virtual private network has a site-to-site configuration for providing site-to-site access, and when said virtual private network is not so available, installing equipment required to establish a site-to-site configuration for said virtual private network;
    - installing large scale encryption into said site-to-site virtual private network;
  - accessing said process software through said site-to-site configuration with large scale encryption; and
    - accessing said process software further comprises at least one of: dialing into said network access server, and attaching directly via a modem into said network access server, said modem being selected from the group of modems consisting of telephone dial-up modems, cable modems, DSL modems, and wireless modems.

2. The system as claimed in claim 1, wherein said calendaring and reminder system further performs:
   checking said calendar application for scheduling conflicts by comparing said calendar parameters to data stored in said calendar application;
   alerting said computer user when a scheduling conflict exists; and
   in response to a request by said computer user, performing at least one of: bypassing said scheduling conflict and retaining conflicting scheduling data; and discarding selected calendar parameters to avoid said scheduling conflict.

3. The system as claimed in claim 1, wherein said automatically storing said calendar entry record in a calendar application includes prompting said computer user to select a calendar application for storing said calendar entry record when more than one calendar application exists on said computer user's computer system.

4. The system as claimed in claim 1, wherein said text is selected for analysis by said computer user.

5. The system as claimed in claim 1, wherein said text is:
   entered by said computer user using a software application;
   displayed on said computer screen in response to accessing a web site;
   displayed on said computer screen in response to accessing a web page;
   displayed on said computer screen in response to opening an email message;
   displayed on said computer screen in response to opening a document.

6. The system as claimed in claim 1, wherein said source includes at least one of: a web site address; a uniform resource locator; a file name and path in a directory; and an email folder.

7. The system as claimed in claim 1, wherein said calendaring and reminder system further performs:
   analyzing said calendar entry records for validating currency of calendar data and updating said data when applicable, said analyzing said calendar entry records and updating said data comprises:
   opening a source associated with a calendar entry record to be analyzed;
   comparing content displayed upon said opening a source with content in said calendar entry record;
   when content displayed upon said opening a source is not similar to content in said calendar entry record:
   presenting both sets of data to said computer user; and
   prompting said computer user to select from options including at least one of:
   updating said calendar entry record with new data found as a result of said opening a source associated with a calendar entry record;
   creating a new calendar entry record;
   canceling said calendar entry record; and
   when content displayed upon said opening a source is similar to content in said calendar entry record, retaining said calendar entry record.

8. The system as claimed in claim 7, wherein said calendaring and reminder system further performs:
   including a notice in a calendar entry record when a source associated with said calendar entry record to be analyzed cannot be opened.

9. The system as claimed in claim 1, wherein said meeting type comprises a location, said location including at least one of: a conference call number; a physical address; an online address for a chat room or web-enabled presentation.

10. The system as claimed in claim 1, wherein said installing said process software further comprises:
    determining when programs will reside on said at least one server when said process software is executed;
    identifying said at least one server that will execute said process software; and
    transferring said process software to storage for said at least one server.

11. The system as claimed in claim 1, wherein said sending said process software to said first computer client further includes having said at least one server automatically copy said process software to said first computer client, and running an installation program at said first computer client to install said process software on said first computer client.

12. The system as claimed in claim 1, wherein said sending said process software to said first computer client further comprises identifying a user and an address of said first computer client.

13. The system as claimed in claim 1, wherein said sending said process software to said first computer client includes sending said process software to at least one directory on said first computer client.

14. The system as claimed in claim 1, wherein said sending said process software to said first computer client includes sending said process software to said first computer client via e-mail.

15. The system as claimed in claim 1, wherein said calendaring and reminder system further performs:
    posting said on demand charge on a web site when requested by said requesting customer; and
    sending said on demand charge via e-mail to said requesting customer's e-mail address.

* * * * *